(12) United States Patent
Harrison

(10) Patent No.: US 9,866,144 B2
(45) Date of Patent: Jan. 9, 2018

(54) THREE PORT CONVERTER WITH DUAL INDEPENDENT MAXIMUM POWER POINT TRACKING AND DUAL OPERATING MODES

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 553 days.

(21) Appl. No.: 14/140,221

(22) Filed: Dec. 24, 2013

(65) Prior Publication Data
US 2014/0183953 A1     Jul. 3, 2014

Related U.S. Application Data

(60) Provisional application No. 61/747,358, filed on Dec. 30, 2012, provisional application No. 61/799,958, filed on Mar. 15, 2013.

(51) Int. Cl.
*H02J 5/00* (2016.01)
*H02M 7/48* (2007.01)
*H02J 3/38* (2006.01)

(52) U.S. Cl.
CPC ........... *H02M 7/4807* (2013.01); *H02J 3/385* (2013.01); *H02J 5/00* (2013.01);
(Continued)

(58) Field of Classification Search
CPC ....................................................... H02J 5/00
(Continued)

(56) References Cited

U.S. PATENT DOCUMENTS

| 4,052,657 A | * | 10/1977 | Kleiner | .................. H02M 7/49 363/43 |
| 5,260,864 A | | 11/1993 | Simonelli et al. | |

(Continued)

FOREIGN PATENT DOCUMENTS

| EP | 1973220 A1 | 9/2008 |
| EP | 2234237 A1 | 9/2010 |

(Continued)

OTHER PUBLICATIONS

Sheng-Yang et al., "A multiple-input current-source converter for a stand-alone hybrid power system", Applied Power Electronics Conference and Exposition (APEC), 2011 Twenty-Sixth Annual IEEE, pp. 35-40, Mar. 2011.

(Continued)

*Primary Examiner* — Adi Amrany
(74) *Attorney, Agent, or Firm* — Moser Taboado

(57) ABSTRACT

A method and apparatus for a three port converter with independent dual input comprising: a first DC port for coupling a first half-bridge circuit of the three-port converter to a first external DC line, a second DC port for coupling a second half-bridge circuit of the three-port converter to a second external DC line, wherein the second half-bridge circuit is decoupled from the first half-bridge circuit, and an AC port for coupling to an external AC line, wherein (i) the first half-bridge circuit and the second half-bridge circuit are operated as a full H-bridge during a full-bridge operating mode, and (ii) the first half-bridge circuit or the second half-bridge circuit is operated as a half H-bridge during a half-bridge operating mode.

18 Claims, 6 Drawing Sheets

(52) U.S. Cl.
CPC .. *H02M 2007/4815* (2013.01); *Y02B 70/1441* (2013.01); *Y02E 10/58* (2013.01); *Y10T 307/549* (2015.04)

(58) Field of Classification Search
USPC .................................................. 307/43–45
See application file for complete search history.

(56) References Cited

U.S. PATENT DOCUMENTS

| | | | |
|---|---|---|---|
| 5,512,801 A | 4/1996 | Nilssen | |
| 5,933,339 A * | 8/1999 | Duba | H02M 7/49 363/41 |
| 6,005,788 A * | 12/1999 | Lipo | H02M 7/49 363/71 |
| 6,198,178 B1 | 3/2001 | Schienbein et al. | |
| 7,009,859 B2 | 3/2006 | Chen et al. | |
| 7,808,125 B1 * | 10/2010 | Sachdeva | H02M 7/49 307/30 |
| 7,830,687 B2 * | 11/2010 | Du | H02M 7/49 307/45 |
| 8,212,409 B2 | 7/2012 | Bettenwort et al. | |
| 8,526,205 B2 | 9/2013 | Garrity | |
| 8,526,206 B2 * | 9/2013 | Fotherby | 327/424 |
| 8,872,384 B2 * | 10/2014 | Stratakos | H02J 3/383 307/104 |
| 2007/0120543 A1 | 5/2007 | Caldwell | |
| 2008/0298104 A1 * | 12/2008 | Sachdeva | H02M 7/49 363/98 |
| 2010/0145546 A1 | 6/2010 | Yoo et al. | |
| 2011/0019454 A1 | 1/2011 | Fotherby | |
| 2011/0181128 A1 | 7/2011 | Perreault et al. | |
| 2011/0261593 A1 | 10/2011 | Pan et al. | |
| 2012/0020137 A1 | 1/2012 | Abe | |
| 2012/0112550 A1 | 5/2012 | Schill | |
| 2012/0153729 A1 * | 6/2012 | Song | H02J 7/0013 307/82 |
| 2012/0313443 A1 | 12/2012 | Cheng et al. | |
| 2013/0002031 A1 | 1/2013 | Mulkey et al. | |
| 2013/0043733 A1 | 2/2013 | Frolov et al. | |
| 2014/0001858 A1 * | 1/2014 | Kwasinski | H02M 3/33569 307/52 |
| 2015/0043254 A1 * | 2/2015 | Preckwinkel | H02M 7/49 363/41 |
| 2015/0048681 A1 * | 2/2015 | Kwasinski | H02M 3/3372 307/52 |
| 2015/0097434 A1 * | 4/2015 | Harrison | H02J 3/383 307/43 |

FOREIGN PATENT DOCUMENTS

| | | |
|---|---|---|
| JP | 2003324956 A | 11/2003 |
| WO | WO-2009008739 A1 | 1/2009 |
| WO | WO-2012062375 A1 | 5/2012 |

OTHER PUBLICATIONS

Ruichen et al., "Technological assessment of DC-DC multiple-input converters as an interface for renewable energy applications", Renewable Energy Research and Applications (ICRERA), 2012 International Conference on, pp. 1-6, Nov. 2012.

Kwasinski, "DC/DC Multiple-Input Power Converters for Renewable Energy Applications", The University of Texas at Austin, Office of Technology Commercialization, 1 Page.

Shen et al., "Multi-Input Converter with MPPT Feature for Wind-PV Power Generation System", International Journal of Photoenergy, Hindawi Publishing Corporation, vol. 2013, #129254, 13 pages.

Sivamkumar et al., "Control of Hybrid System Using Multi-Input Inverter and Maximum Power Point Tracking", International Journal of Engineering Research and Applications, vol. 3, Issue 4, Jul.-Aug. 2013, pp. 77-81.

PCT International Search Report and the Written Opinion of the International Searching Authority for PCT/US2013/077671, Apr. 8, 2014.

PCT Search Report and Written Opinion, PCT/US2013077671, Mailed on Apr. 8, 2014.

Extended European Search Report dated Oct. 5, 2016 for Application No. 13868301.6.

Brandon J. Pierquet et al., "A Single-Phase Photovoltaic Inverter Topology with a Series-Connected Power Buffer", IEEE, 2010, 8 pgs.

Hongfei Wu et al., "Full-Bridge Three-Port Converters With Wide Input Voltage Range for Renewable Power Systems", IEEE, 2012, 10 pgs.

Sheng-Yang Yu, "Multiple-input Soft-switching Converters in Renewable Energy Applications", IEEE, 2012, 8 pgs.

* cited by examiner

THREE PORT CONVERTER WITH DUAL INDEPENDENT MAXIMUM POWER POINT TRACKING AND DUAL OPERATING MODES

CROSS-REFERENCE TO RELATED APPLICATIONS

This application claims priority to U.S. Provisional Patent Application No. 61/747,358 filed on Dec. 30, 2012, and U.S. Provisional Patent Application No. 61/799,958 filed on Mar. 15, 2013, which are incorporated by reference herein in their entirety.

BACKGROUND

Field

Embodiments of the present disclosure relate generally to power conversion, and, in particular, to a three port converter with dual independent maximum power point tracking and dual operating modes.

Description of the Related Art

Resonant converters provide many advantages over other types of power converters. Such advantages may include low noise, low component stress, low component count, and predictable conduction-dominated losses. Resonant converters may therefore be smaller, less costly, and more efficient devices that other types of converters.

Converters are often used in power generation for distributed generators such as photovoltaic (PV) panels or modules that produce DC voltage. The PV modules are conventionally connected in series and generate power at varying rates depending on operating factors such as the environment. Typically, a Maximum Power Point Tracking (MPPT) algorithm will find the optimum operational point in order to extract the maximum power from the series string of PV modules. During power generation among multiple PV panels, varying amounts of DC voltage may be generated over a particular time period.

FIG. 1 is a schematic diagram of a series connected resonant converter in accordance with the related art. FIG. 1 depicts a converter 100 coupled to a voltage source 102 comprising two voltage sources (105 and 110) in series, connected in parallel to a bridge circuit 122. The bridge circuit 122 is comprised of four switches (120, 125, 130, 135) coupled in an H-bridge configuration to a first side of a transformer 150. Switches 120 and 125 are connected through an inductor 140 to a first terminal of the transformer's primary winding, and switches 135 and 130 are connected to a second terminal of the primary winding via a series capacitor 145. The transformer 150 passes power from a secondary winding to a three phase AC switching circuit 126 and ultimately to respective three phase outputs 198. The AC switching circuit 126 comprises two transistors (155/160) in series with a first capacitor 185, the combination coupled in parallel with mirrored transistors (165/170) that are in series with a second capacitor 190, and also with transistors (175/180) that are in series with a third capacitor 195. A node is connected between each pair of transistors in the AC switching circuit 126 and the corresponding capacitors to connect and form each line of the three phase output 198.

The series-connected voltage sources 105 and 110, which may be a string of multiple PV modules, provides more power for conversion than a single PV module. Since the PV modules are coupled in series though, MPPT must be performed on the combined pair of PV modules, which is less efficient than MPPT at the individual panel level. Additionally, the series-connected string of PV modules is capable of creating a high enough voltage potential to be able to sustain an electrical arc should the DC current be interrupted by virtue a faulty connector or wire conductor. An arc of this type has the potential to start a fire in the DC circuit wiring that could spread to other parts of the system or the building that the PV system is installed upon. Safety legislation stipulates that if the total DC voltage generated by a series string of PV modules exceed 80 volts then some form of arc detection and protection is needed, requiring additional circuitry to be added to the converter in order to protect the system from any potential arc that could cause a fire in the DC circuit.

Therefore, there is a need in the art for a method and apparatus for efficiently converting power from a plurality of DC sources.

SUMMARY

Embodiments of the present invention generally relate to a method and apparatus for converting DC power to AC power. Embodiments of the present invention generally relate to a method and apparatus for a three-port converter comprising a first DC port for coupling a first half-bridge circuit of the three-port converter to a first external DC line. The converter also includes a second DC port for coupling a second half-bridge circuit of the three-port converter to a second external DC line, wherein the second half-bridge circuit is decoupled from the first half-bridge circuit. The converter further includes an AC port for coupling to an external AC line, wherein (i) the first half-bridge circuit and the second half-bridge circuit are operated as a full H-bridge during a full-bridge operating mode, and (ii) the first half-bridge circuit or the second half-bridge circuit is operated as a half H-bridge during a half-bridge operating mode. Embodiments of the converter are shown in and/or described in connection with at least one of the figures, as set forth more completely in the claims.

Various advantages, aspects and novel features of the present disclosure, as well as details of an illustrated embodiment thereof, will be more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to a method and apparatus for a three-port converter having two separate DC connections and a single AC connection. In some embodiments of the present invention, the three-port converter is a DC-AC converter having two separate and distinct DC sources (e.g., photovoltaic PV modules) coupled to respective individual DC half-bridge circuits that are decoupled from one another. As a result of the DC sources being couple to separate DC half-bridge circuits, the DC input voltage remains at a sufficiently low level as to forego requirements for arc protection circuits. Additionally, based on operating conditions such as specific required output power levels, the half-bridge circuits may be operated in unison (i.e., full-bridge conversion) for a combined output power, or one at a time for a comparatively lower output power. In embodiments where the DC sources may be operated at maximum power points (MPPs), e.g., where the DC sources are PV modules, the output from each DC source has individual maximum power point tracking (MPPT) allowing for independent MPPT control. MPPT algorithms may be independently executed (e.g., by a controller of the three-port converter) and advantageously, the individual DC sources can each be operated at their own individual MPP optima that the sum of the harnessed energy would be greater than for a conventional series connected string.

In some other embodiments, the three-port converter may be an AC-DC converter where an AC input power is converted to a single DC output of to two separate DC outputs.

Figure 1:
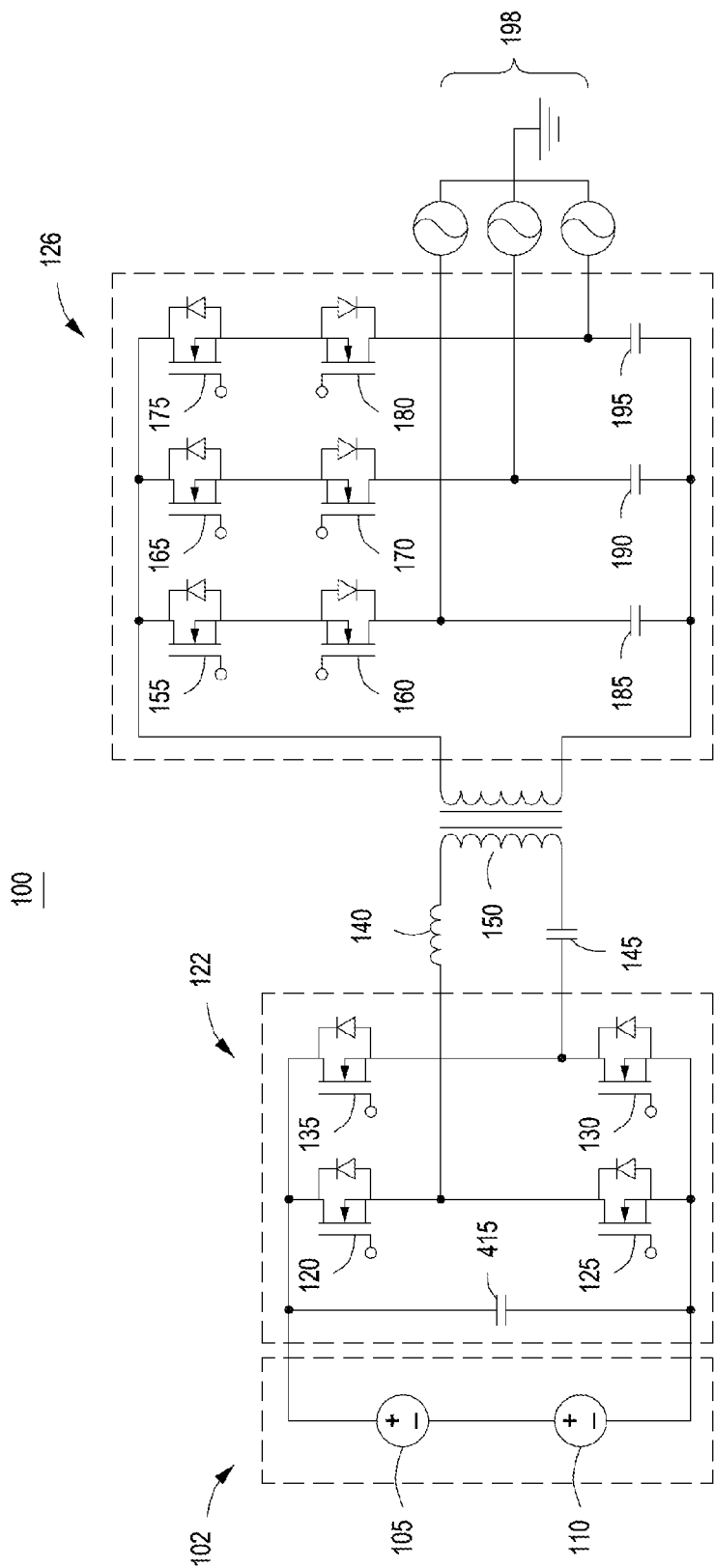
FIG. 1 is a schematic diagram of a series connected resonant converter in accordance with the related art.
Figure 2:
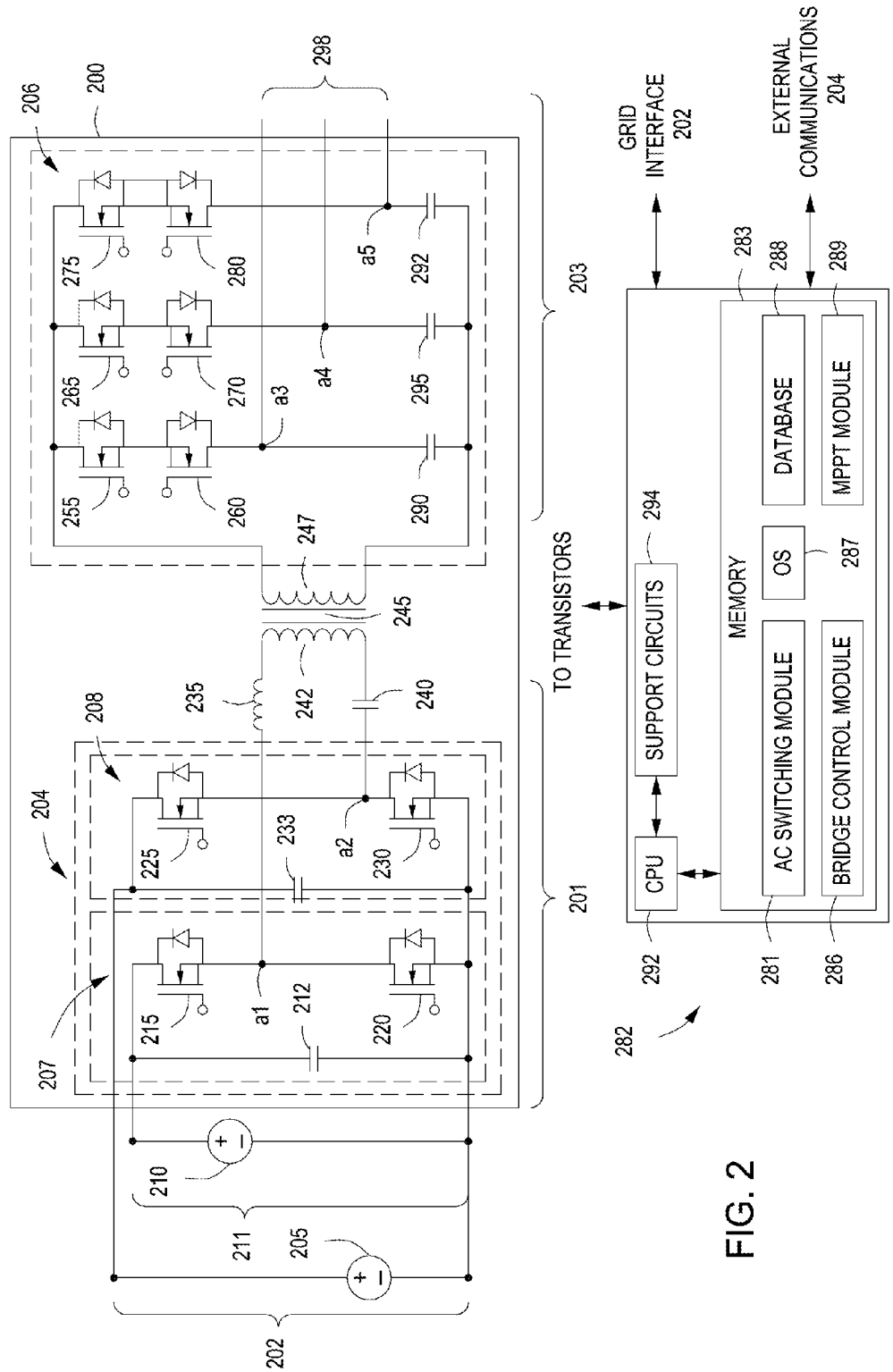
FIG. 2 is a schematic diagram of a resonant converter in accordance with an embodiment of the present invention.

FIG. 2 is a block diagram of a resonant converter 200 in accordance with one or more embodiments of the present invention. This diagram portrays one variation of a myriad of possible system configurations. The present embodiment can function in a variety of power generation environments and systems. The resonant converter (hereinafter "converter") 200 is operated by the controller 282. The converter 200 is described as outputting a multi-phase AC output, however, alternative embodiments include single phase operation and output, two-phase (e.g., split phase) output, or AC-DC power conversion.

Switches described herein may be n-type metal-oxide-semiconductor field-effect transistors (MOSFETs) or, alternatively, any other suitable electronic switch, such as insulated gate bipolar transistors (IGBTs), bipolar junction transistors (BJTs), p-type MOSFETs, gate turnoff thyristors (GTOs), and the like. Switches disclosed herein are depicted as transistors (i.e., FETs) with diodes connected across the source and drain. While the diodes represent an intrinsic property of the transistors, further embodiments may place an actual transistor at their location.

The converter 200 comprises input ports 211 and 202, bridge circuit 204, an inductor 235, a resonant circuit comprising capacitor 240 and inductor 235, an isolation transformer 245, AC switching circuit 206, and an output port 298. The converter 200 comprises a DC-side 201 (i.e., on the primary side of the transformer 245) and an AC-side 203 (i.e., on the secondary side of the transformer 245). The DC-side 201 includes circuitry for the conversion of received DC power from the input ports 211 and 202. The AC-side 203 includes circuitry for the conversion of power from the DC-side into AC power for the output port 298. The output port 298 is coupled to an AC line; in some embodiments, the output port 298 couples power to a commercial power grid.

A first PV module 205 and a second PV module 210 are coupled across ports 202 and 211, respectively. The first PV module 205 and the second PV module 210 are represented in FIG. 2 by voltage sources outputting a DC power (e.g., a 60 cell PV panel). In alternative embodiments, the first PV module 205 and the second PV module 210 are other types of DC sources, such as other types of renewable energy sources (e.g., a wind turbine, hydroelectric system, and the like), batteries, or the like.

The bridge circuit 204 is coupled between the input ports 211/202 and a series combination of the inductor 235, the primary winding of the isolation transformer 245, and the capacitor 240. The bridge circuit 204 outputs a high frequency waveform (e.g., a 100 kilohertz (KHz) square wave) that passes through the inductor 235 and resonant capacitor 240 to output a substantially sinusoidal current waveform to the isolation transformer 245.

The bridge circuit 204 comprises a first half-bridge circuit 207 and a second half-bridge circuit 208. The first half-bridge circuit 207 comprises an input capacitor 212, switch 215, and switch 220. The input capacitor 212 receives DC power from the input port 211 and is coupled in parallel with the PV module 210. The input capacitor 212 is also coupled across a series combination of switches 215 and 220, hereinafter referred to as a "switch pair" 215/220. Node a1 is located between the switch pair 215/220 for outputting half-wave inverted power (e.g., a 100 KHz square wave) from the second PV module 210. Node a1 is coupled to a first terminal of the inductor 235, and the second terminal of the inductor 235 is coupled to a first terminal of the primary winding 242 of the isolation transformer 245.

The second half-bridge circuit 208 comprises an input capacitor 233, switch 225, and switch 230. The input capacitor 233 receives DC power from the input port 202 and is coupled in parallel with the PV module 205. The input capacitor 233 is also coupled across a series combination of switches 215 and 220, hereinafter referred to as a "switch pair" 225/230. Node a2 is located between the switch pair 225/230 for outputting half-wave inverted power (e.g., a 100 KHz square wave) from the PV module 205. Node a2 is coupled to a first terminal of the resonant capacitor 240. A second terminal of the resonant capacitor 240 is coupled to a second terminal of the primary winding 242 of the isolation transformer 245.

In some alternative embodiments, the inductor 235 may represent a leakage inductance of the isolation transformer 245 rather than being a separate inductor, thereby reducing the overall component count of the converter 200. In other alternative embodiments, other types of resonant circuits (e.g., series LC, parallel LC, series-parallel LLC, series-parallel LCC, series-parallel LLCC, and the like) may be utilized within the resonant converter 200.

The isolation transformer 245 comprises the primary winding 242 and a secondary winding 247. The isolation transformer 245 couples power from the DC-side 201 to the AC-side 203. The primary winding 242 is coupled to a terminal of the inductor 235 on one leg and a terminal of the capacitor 240 on the other leg such as to couple power from the bridge circuit 204. The secondary winding 242 is coupled across an input of the AC-switching circuit 206. The isolation transformer 245 may be a step-up or step-down transformer for respectively increasing or decreasing the magnitude of the voltage output from the bridge circuit 204.

The AC-switching circuit 206 operates as a three phase cycloconverter. The AC-switching circuit 206 comprises switches 255, 260, 265, 270, 275, and 280; and capacitors 290, 295, and 292. Switches 255 and 260 are coupled in series combination to form a switch pair 255/260 that is coupled in series to the capacitor 290. A node a3 is located between the switch pair 255/260 and the capacitor 290 forming a first leg of the output port 298. Switches 265 and 270 are coupled in series combination to form a switch pair 265/270 that is coupled in series to the capacitor 295. A node a4 is located between the switch pair 265/270 and the capacitor 295 forming a second leg of the output port 298. Switches 275 and 280 are coupled in series combination to form a switch pair 275/280 that is coupled in series to the capacitor 292. A node a5 is located between the switch pair 275/280 and the capacitor 292 forming a third leg of the output port 298. Each leg outputs an AC power of a different phase offset to form a three phase output power. In alternative embodiments, the AC-switching circuit 206 may be a single-phase cycloconverter for generating single-phase output; in still other embodiments, the AC switching circuit 206 may generate two phases (e.g., split phase output).

The converter 200 further comprises a controller 282. Gate terminals and source terminals of each of the switches (215, 220, 225, 230, 255, 260, 265, 270, 275, 280) are coupled to the controller 282 for operatively controlling the switches.

As a result of the topology of the half-bridges 207 and 208, the voltages of the PV modules 205 and 210 do not add serially and therefore, the DC input voltage level may be kept below a level where arc protection is mandated (e.g., 80 volts (V)). Additionally, the PV modules 205 and 210 may be individually biased to different operating voltages for independent MPPT at the individual "per-panel" level. Further, the converter 200 may be operated in a "half-bridge mode" or a "full-bridge mode" as described below to provide a wide control range that generates maximum output voltage near the peaks of the AC line voltage and low output voltages near the AC line voltage zero-crossings.

When operating in the full-bridge mode, both the first half-bridge circuit 207 and second half-bridge circuit 208 of the bridge circuit 204 operate as an H-bridge. The controller 282 alternately activates and deactivates switch pairs 215/230 and 220/225 at substantially 180 degrees out of phase to supply power to the AC-switching circuit 206. The switch pairs 215/230 and 220/225 are respective diagonals of the H-bridge configuration. The switching frequency in the full-bridge mode in some embodiments is on the order of 100 KHz. In the full bridge mode, the amount of power from each of the PV modules 205 and 210 may be apportioned by setting the balance of the duty cycles between the switch pairs 215/230 and 220/225 (for example, the ratio of duty cycles may be set to 49/51 in order to draw more power from a PV module than the other). The full-bridge mode may be utilized near the positive and negative peaks of the AC line voltage when maximum output voltage is required.

When operating in the half-bridge mode, either the first half-bridge circuit 207 (switch pair 215/220) or the second half-bridge circuit 208 (switch pair 225/230) supplies power to the AC-switching circuit 206. Thus, the power output in the half-bridge mode will be less than in the full-bridge mode.

In some embodiments, the half-bridge not supplying power in a given time period has one switch in an ON position and the other switch in the OFF position. The selection of which switch is in the ON or OFF position determines the involvement of a different number of ports (i.e., two of the three ports or all three ports). In a half-bridge mode example, the first half-bridge circuit (e.g., LHS) 207 is supplying power to the AC-switching circuit 206, and the second half-bridge (e.g., RHS) 208 is not supplying power. In this example, a first option has transistor 220 in an ON position when transistor 225 is in an OFF position. In a second option, transistor 220 is OFF when transistor 225 is ON. If transistor 220 is in the ON position and transistor 225 is in the OFF position, the energy exchange within the converter 200 involves two ports (e.g., input port 211 and AC port 298). However, if transistor 220 is in the OFF position and transistor 225 is in the ON position, energy exchange involves three ports (e.g., input ports 202 and 211, and AC port 298) since energy will flow into the second half-bridge 208 and charge input capacitor 233. The amount of energy stored is determined by the apparent impedance of this capacitor during the operational time of the half-bridge mode. A similar operation occurs in the half-bridge mode where the second half-bridge circuit 208 is supplying power and switches 215 and 230 are either held in an ON or OFF position. The two operational half-bridge modes allow the overall energy flow into or out of each of the three ports (202, 211, and 298) to be independently controlled.

However, in practical operation, the half-bridge not supplying power may operate to only charge a respective input capacitor. For example, should the first half-bridge circuit 207 operate to supply power to the AC-switching circuit 206, the second half-bridge circuit 208 operates only to maintain a charge on the second input capacitor 233. Conversely, when the second half-bridge circuit 208 supplies power, the first half-bridge circuit 207 only operates to maintain a stored charge on first input capacitor 212. The half-bridge mode may be utilized near the zero-crossings of the AC line voltage when low output voltage is required. One embodiment of a half-bridge mode operation may be found in commonly assigned U.S. provisional patent application No. 61/783,583, entitled "Method and Apparatus for Determining a Bridge Mode for Power Conversion" and filed Mar. 14, 2013, which is herein incorporated by reference in its entirety.

In some embodiments, the half-bridge that is operated may be alternated each time the half-bridge mode is employed. For example, the first half-bridge circuit 207 may be operated near a first zero-crossing of the AC line voltage, and the second half-bridge may be operated near the next zero-crossing of the AC line voltage. The amount of time each half-bridge is active may be adjusted to adjust the amount of power drawn for each PV module 205 and 210, e.g., to bias the PV modules 205 and 210 at respective desired operating voltages.

In some embodiments, the converter operating mode (e.g., full-bridge or half-bridge mode) and corresponding parameters (e.g., duty cycle allocation during full-bridge mode, amount of switching time apportioned to each half-bridge during half-bridge mode) are predetermined for various combinations of operating parameters. For example, for given values of power and voltage received from each PV module, the AC line RMS voltage, and the AC line instantaneous voltage, a predetermined converter operating mode/parameters may be employed. In some such embodiments, a look-up table (LUT) may be used for identifying the converter operating parameters based on a given set of operating conditions In either mode, a substantially sinusoidal waveform is output and coupled across the isolation transformer 245. The AC-switching circuit 206 selectively couples the substantially sinusoidal waveform coupled across from the second winding 247 to each node (i.e., a3, a4, and a5) to output a three phase AC power. The capacitors 282, 286, and 292 are selectively charged and discharged by toggling switches 255, 260, 265, 270, 275, and 280 to smooth the respective AC waveforms for each node. Alternative embodiments with a single phase output may have a single phase cycloconverter substituted for the AC-switching circuit 206.

In some embodiments, separate current and voltage samplers (not shown) at each input port 211 and 202 monitor the respective DC inputs. In addition AC voltage and/or current samplers (not shown) monitor AC voltage on the AC line at the output port 298. In other embodiments, the samplers may include analog to digital converters for sending sampling data to the controller 282.

The controller 282 comprises a CPU 292 coupled to support circuits 294 and memory 283 containing, for example, instructions, data, and algorithms. The controller 282 may be comprised of hardware, software, or a combination thereof. The CPU 292 may comprise one or more conventionally available processors, microprocessors, microcontrollers, and/or combinations thereof configured to execute non-transient software instructions to perform various tasks in accordance with the present invention. The controller 282 may be implemented using a general purpose computer that, when executing particular software, becomes a specific purpose computers for performing various embodiments of the present invention. The CPU 292 processing inputs and outputs to the transistors/switches, external communications 204 (e.g., to a gateway) and an AC line interface 202. Support circuits 294 are well-known circuits used to promote functionality of the CPU 292. Such circuits include, but are not limited to a cache, power supplies, clock circuits, buses, input/output circuits, and the like. Additionally, the support circuits 294 may include circuitry for sensors (e.g., voltage, current, temperature, photo-detectors and the like) used to determine operating conditions and data. Alternative embodiments may use control algorithms on a custom Application Specific Integrated Circuit (ASIC). In some embodiments, converter control techniques described herein that are executed by the controller 282 may be compatible with Reactive Power Control (RPC) requirements that come from Advanced Grid Functional (AGF) requirements.

The memory 286 may comprise random access memory, read only memory, removable disk memory, flash memory, or various combinations of these. The memory 286 may store various forms of application software, such as a bridge control module 286, operating system (OS) 287, MPPT module 289, AC switching module 281, and a database 288.

The operating system 287 facilitates interaction of the modules in memory 286 on the CPU 292 and support circuits 294. The MPPT module 289 is executed to determine the Maximum Power-Point (MPP) for each of the PV modules 205 and 210. Each PV module 205 and 207 may be independently operated at a corresponding MPP. The bridge control module 286 controls operation of switches 215, 220, 225, and 230 of the bridge circuit 204 and half-bridges 207 and 208 as described herein. The bridge control module 286 is executed for operating the bridge switches 215, 220, 225, 230 to bias the PV modules 205 and 210 at desired operating voltages corresponding to respective MPPs as determined by the MPPT module 289. The bridge control module 286 determines whether to operate in a full-bridge mode or a half-bridge mode as well as operating frequency and duty cycles for the H-bridge diagonals during the full bridge mode. The bridge control module 286 also determines the amount of time to apportion to the first half-bridge circuit 207 versus the second half-bridge circuit 208 for switching during the half-bridge mode.

The AC-switching module 281 operates switches 255, 260, 265, 270, 275, and 280 of the AC-switching circuit 206 to output a desired AC power at the output port 298. The database 288 stores data related to operation of the converter 200 as well as data related to the present invention, such as data used to determine operating parameters for the converter 200 based on real-time operating conditions for future recall (e.g., using a LUT).

Some examples for single and three phase conversion may be found in commonly assigned patent application U.S. Pat. App. 2012/0170341 entitled "Method and Apparatus for Resonant Power Conversion" filed Jan. 3, 2012, which is herein incorporated by reference in its entirety.

Figure 3:
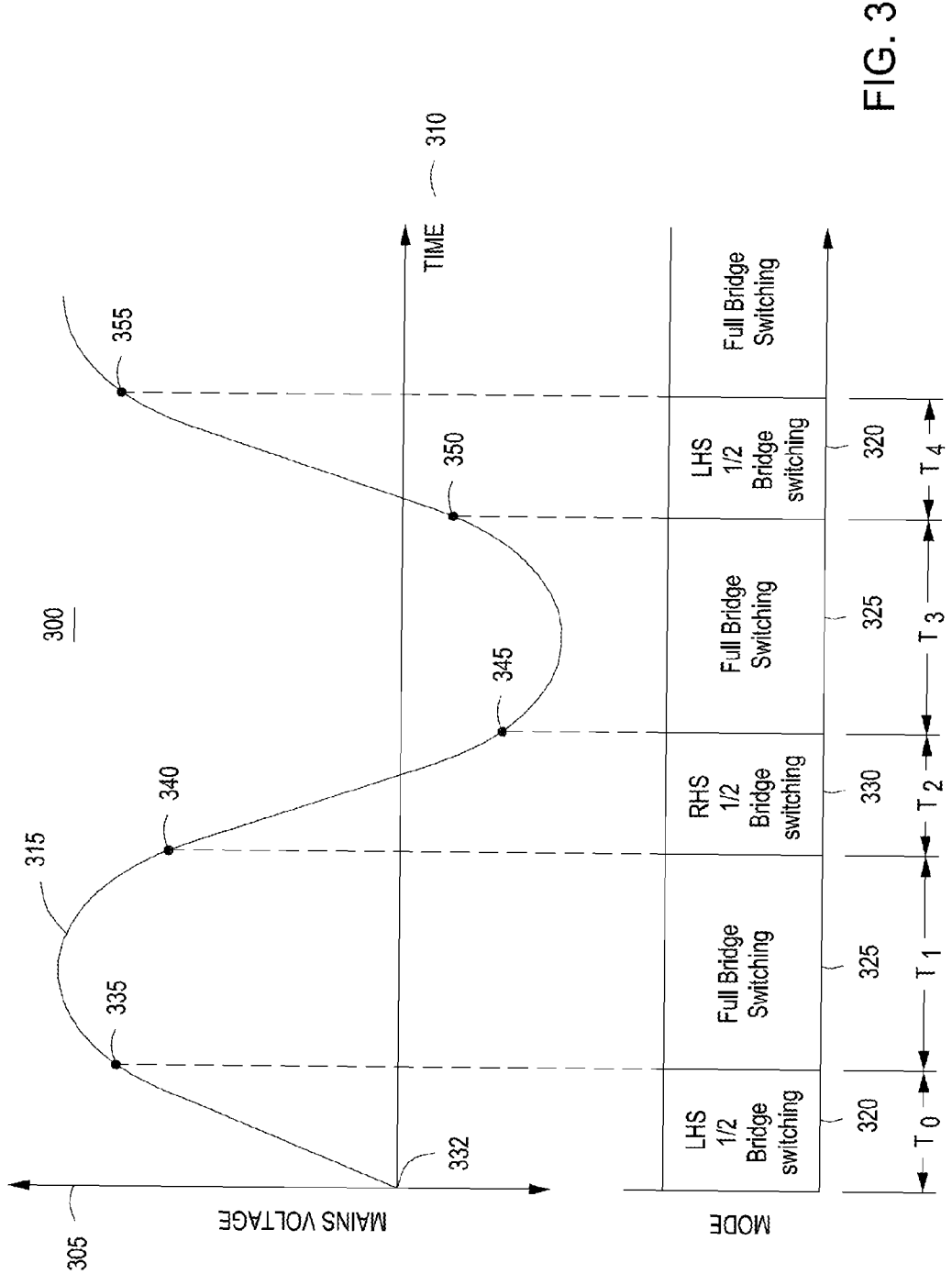
FIG. 3 is a waveform diagram depicting periods of full-bridge operation and half-bridge operation in accordance with an embodiment of the present invention.

FIG. 3 is a waveform diagram depicting periods of full-bridge operation and half-bridge operation in accordance with an embodiment of the present invention. As previously described, the full-bridge and half-bridge modes allow for dual input control as well as conserves switching energy losses. The waveform diagram 300 depicts an AC line voltage cycle 315 (e.g., a mains voltage waveform cycle) plotted on a graph of voltage amplitude 305 versus a time 310. Operating modes for the bridge circuit 204 are selected based, at least in part, on the AC line voltage cycle 315 by the controller 282 to efficiently provide output power from the converter over a wide range. Operating modes include a left hand side (LHS) half-bridge mode 320 (i.e., where the half-bridge circuit 207 is operated as a half H-bridge), a full bridge mode 325 (i.e., where the bridge 204 is operated as an H-bridge), and a right hand side (RHS) half-bridge mode 330 (i.e., where the half-bridge circuit 208 is operated is operated as a half H-bridge).

In the exemplary embodiment shown in FIG. 3, the converter 200 is operated using the LHS half-bridge mode 320 through time period $T_0$ that begins at a first zero crossing 332 and ends at point 335 on the rising slope of the AC line voltage cycle 315. Substantially simultaneously, the bridge circuit 204 begins operating in the full-bridge mode 325 over a time period $T_1$ that includes a positive peak of the AC line voltage (i.e., from point 335 to point 340). On the falling slope of the AC line voltage cycle 315, at point 340, the full-bridge mode 325 ends and the RHS half-bridge mode 330 begins at point 340; the RHS half-bridge mode 330 continues throughout a time period $T_2$ that ends at a point 345 on the negative side of the AC line voltage cycle 315 before the negative peak. The RHS half-bridge mode 330 ends at the point 345 and the full-bridge mode 325 begins again and continues throughout a time period $T_3$ between point 345 and point 350 between the AC line voltage cycle negative peak and its next zero-crossing. At the point 350, the full-bridge mode 325 ends and the LHS half-bridge mode 320 begins again and continues throughout a time period $T_4$ that begins at point 350 and continues through point 355 prior to the next AC line voltage cycle positive peak.

The decision as to which bridge mode to operate in is made based on current operating conditions at each point in time. Operation in full-bridge mode occurs near the mains peaks (e.g., between points 335 and 340), and operation in half-bridge mode occurs near the mains voltage zero crossings (e.g., between points 350 and 355). Individual half-bridge modes selected (i.e., either LHS or RHS) are based on an alternating pattern such that the different modes are selected may be driven by the mains line frequency. The logic for switching through the controller 282 adaptively varies the duration for each of the various modes (full-bridge, LHS half-bridge, and RHS half-bridge), as long as the periods will sum to the total mains period. As such, as depicted in FIG. 3 and described above, the duration of the respective time periods for the different bridge operating modes may vary as well as the start and end times. Start and end times may occur simultaneously or substantially simultaneously depending on hysteresis or system timing delays.

For example, the period between points 340 and 345 for the RHS half-bridge mode 330 occurs for a shorter period time period $T_2$ than the time period $T_4$ for the LHS half-bridge mode between points 350 and 355. Accordingly, the full bridge mode 325 may also begin and end at varying intervals. Alternative embodiments may include rearranging the order and/or placement of when the LHS half-bridge mode 320, full bridge mode 325, and RHS half-bridge mode 330 operate.

In the half-bridge modes, only two of the four switches comprising the bridge circuit 204 are actively toggling to output power while the other two switches are held in an ON or OFF position. In a LHS half-bridge mode, half-bridge circuit 207 is outputting power and half-bridge circuit 208 is charging input capacitor 233. In this mode, either transistor 220 is ON when transistor 225 is OFF, or transistor 220 is OFF when transistor 225 is ON. If transistor 220 is in the ON position and transistor 225 is in the OFF position, the energy exchange within the converter 200 involves two ports (e.g., input port 211 and AC port 298). However, if transistor 220 is in the OFF position and transistor 225 is in the ON position, energy exchange involves three ports (e.g., input ports 202 and 211, and AC port 298) since energy will flow into the second half-bridge 208 and charge input capacitor 233. The amount of energy stored is determined by the apparent impedance of this capacitor during the operational time of the LHS half-bridge mode 320. Similarly, in the RHS half-bridge mode 330, switches 220 and 225 are operated to provide output power while switches 215 and 230 are held in either an ON or OFF position. The RHS and LHS half-bridge modes allow independent control of energy flow for each of the three ports (202, 211, and 298). In the full bridge mode 320, all four switches (215, 220, 225, 230) are in operation to provide output power via nodes a1 and a2.

Selection among the bridge operating modes allows for output power optimization based on the operating conditions of the voltage sources 205 and 210 as well as the AC line voltage cycle. As previously described, the duty cycles for the H-bridge diagonals may be varied in order to apportion the amount of power drawn for each PV module as necessary and varied beyond the typical 50/50 duty cycle of a full H-bridge (e.g., 48/52). Similarly, the output power drawn at a1 and a2 may also be unequal to compensate for operating conditions of voltage sources 205 and 210 (environmental, defective PV panels, shading, system maintenance, and the like). In general, the bridge circuit 204 operates in the full bridge mode 325 near the peaks (positive and negative) of the AC line voltage cycle 315. In some embodiments, measurement of various control parameters based on the varying input power (e.g., from the voltage sources), optimization is possible of the bridge circuit 204 output.

In some embodiments, selection among the operating modes may also be predetermined based on different values of a plurality of operating conditions. For example, the converter operating parameters (bridge operating mode, switching duty cycles, amount of switching time apportioned to each half-bridge, and the like) that result in optimal power conversion for a given set of operating conditions (e.g., power and voltage from the voltage sources 205 and 210, RMS voltage of the AC line voltage, instantaneous AC line voltage, and the like) may be predetermined and recorded in memory 286. Various combinations of operating conditions as well as the corresponding converter operating parameters may be stored and recalled from a LUT in the controller 282 for operating the converter 200.

Figure 4:
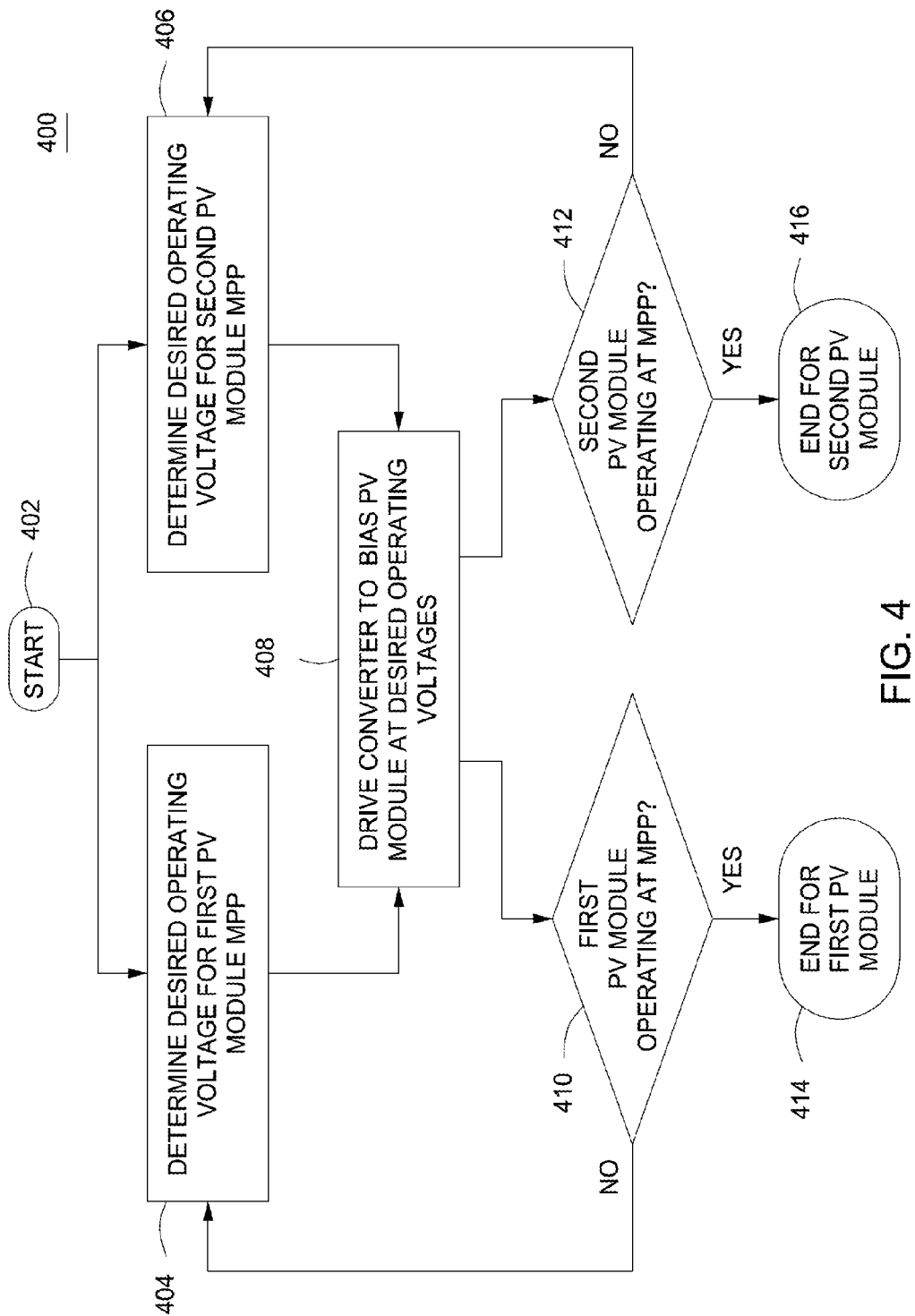
FIG. 4 is a flow diagram of a method for independent maximum power point tracking (MPPT) for a three-port converter in accordance with one or more embodiments of the present invention.

FIG. 4 is a flow diagram of a method 400 for independent maximum power point tracking (MPPT) for a three-port converter in accordance with one or more embodiments of the present invention. The three-port converter is a resonant converter with two separate DC sources each coupled to different DC half-bridges by first and second DC input ports of the converter—i.e., a first DC power source is coupled across the first half-bridge circuit and a second DC power source is coupled across the second half-bridge circuit as shown in FIG. 2. Source terminals of the bottom switches of each half-bridge circuit are coupled to one another and to the negative terminals of the DC power sources. In some embodiments of the method 400, such as the embodiment described below, the DC power sources are photovoltaic (PV) modules; in other embodiments, the DC power sources may be any suitable DC power source such as other types of renewable energy sources (e.g., wind turbines, hydroelectric systems, or the like), batteries, or the like. In the embodiment described below, the three-port converter is a DC-AC resonant converter that generates AC output power, such as the resonant converter 200. The method 400 comprises an implementation of the MPPT module 289 of the controller 282. Alternative embodiments include outputting a DC power wherein the AC switching circuit is replaced with a unipolar bridge circuit (e.g., a half-bridge with two transistors or a full-bridge with four transistors).

The method 400 starts at step 402 and proceeds to steps 404 and 406. At step 404, a desired operating voltage is determined for operating a first of the two PV modules at its maximum power point (MPP). Analogous to step 404, at step 406 a desired operating voltage is determined for operating the second of the two PV modules at its MPP. As a result of being coupled to the different half-bridge circuits of the three-port converter, which are decoupled from one another as previously described, the MPPs for the PV modules may be determined independent from one another and the PV modules may each be operated at voltages completely independent from one another. The different half-bridge circuits are connected but conventionally coupled together such that the input ports 211 and 202 share only one common node.

In one example, if the first PV module suddenly experiences shading while the second PV module does not, changes to the MPP for the first PV module can be determined and the first PV module can be biased, independent of the second PV module's operating voltage, to an operating voltage corresponding to its changed MPP. The steps 404 and 406 may be performed simultaneously or, alternatively, one of the steps may be performed before the other one.

The method 400 proceeds to step 408, where the converter is driven to bias the PV modules at their corresponding desired operating voltages. One embodiment of such operation is described with respect to the method 500 described below. The method then proceeds to steps 410 and 412. At step 410, a determination is made whether the first PV module is operating at its MPP. If the result of such determination is no, that the first PV module is not operating at its MPP, the method 400 returns to step 404 where its desired operating voltage is adjusted to correspond to its MPP. Any suitable MPPT technique may be employed for determining whether the first PV module is operating at its MPP and any corresponding needed change in operating voltage, such as a "perturb and observe" technique. In some embodiments, the MPPT algorithm is implemented at the mains line frequency and this frequency is the frequency that the first PV module operating voltage is adjusted. If, at step 410, the result of the determination is that the first PV module is operating at its MPP, the method 400 proceeds to step 414 where it ends for the first PV module.

Analogous to step 410, at step 412 a determination is made whether the second PV module is operating at its MPP. If the result of such determination is no, that the second PV module is not operating at its MPP, the method 400 returns to step 404 where its desired operating voltage is adjusted to correspond to its MPP. Any suitable MPPT technique may be employed for determining whether the second PV module is operating at its MPP and any corresponding needed change in operating voltage, such as a "perturb and observe" technique. In some embodiments, the MPPT algorithm is implemented at the mains line frequency and this frequency is the frequency that the second PV module operating voltage is adjusted. If, at step 412, the result of the determination is that the second PV module is operating at its MPP, the method 400 proceeds to step 416 where it ends for the second PV module.

Figure 5:
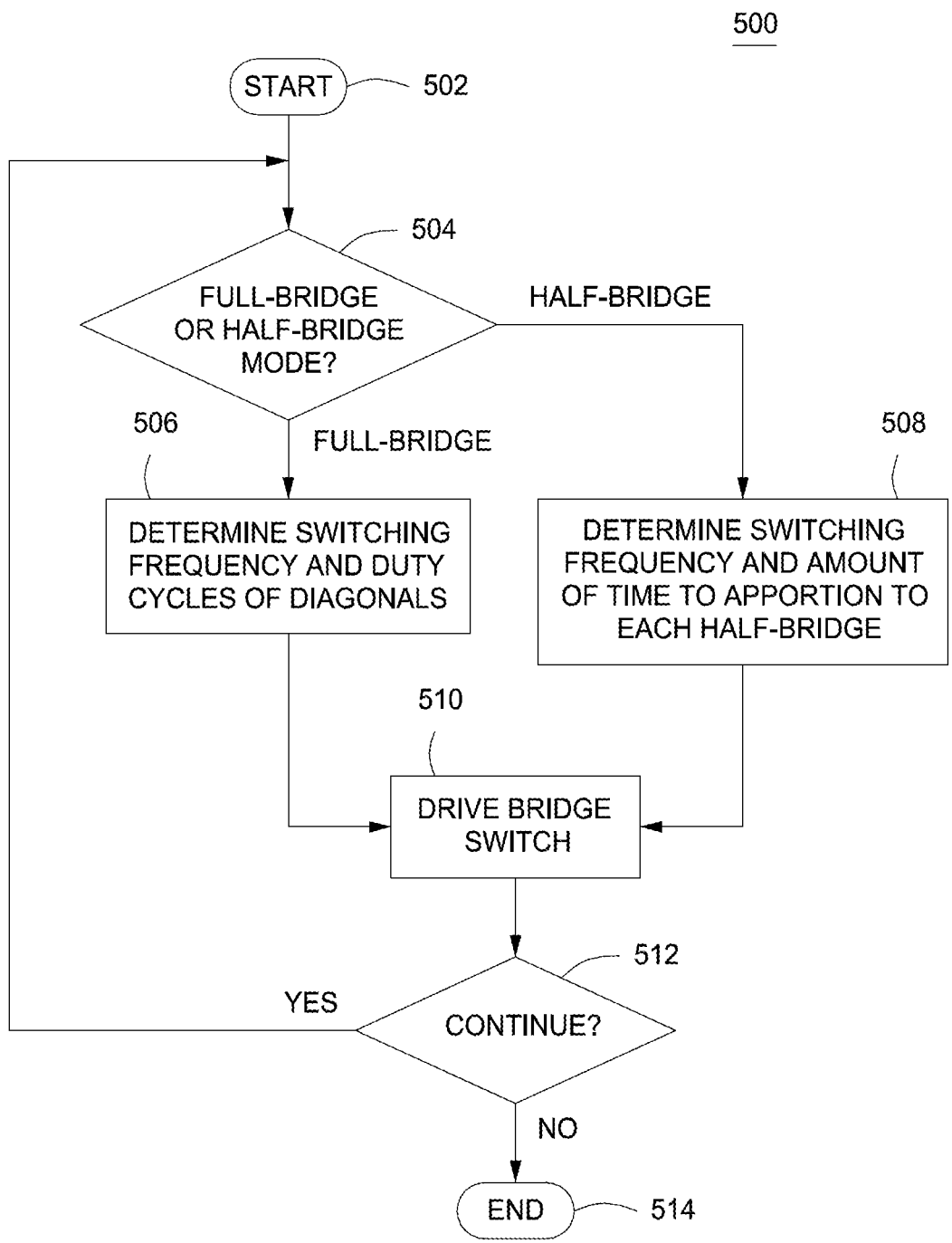
FIG. 5 is a flow diagram of a method for operating DC bridge switching in a three-port converter in accordance with one or more embodiments of the present invention.

FIG. 5 is a flow diagram of a method 500 for operating DC bridge switching in a three-port converter in accordance with one or more embodiments of the present invention. The three-port converter is a resonant converter with two separate DC sources each coupled to different DC half-bridges by first and second DC input ports of the converter—i.e., a first DC power source is coupled across the first half-bridge circuit and a second DC power source is coupled across the second half-bridge circuit as shown in FIG. 2. Source terminals of the bottom switches of each half-bridge circuit are coupled to one another and to the negative terminals of the DC power sources. In some embodiments of the method 500, such as the embodiment described below, the DC power sources are photovoltaic (PV) modules; in other embodiments, the DC power sources may be any suitable DC power source such as other types of renewable energy sources (e.g., wind turbines, hydroelectric systems, or the like), batteries, or the like. In the embodiment described below, the three-port converter is a DC-AC resonant converter that generates AC output power, such as the resonant converter 200. The method 500 is an implementation of the bridge control module 286 of the controller 282 for efficiently operating the converter's DC bridge switches such that a required output is generated by the converter and the DC sources are biased at desired operating voltages. Generally, the desired operating voltages of the DC sources correspond to MPP voltages for each of the DC sources, and the method 500 may be performed at step 408 of the method 400 described above. In some other embodiments, the three-port converter may be an AC-DC converter that receives an AC input and converts the received AC to two different DC outputs or, alternatively, to a single DC output.

The method 500 begins at step 502 and proceeds to step 504. At step 504, a determination is made whether to operate in a full-bridge mode or a half-bridge mode (i.e., a bridge operating mode is determined). As previously described, for full-bridge mode the four switches at the converter's DC input are operated in an H-bridge switching configuration—i.e., the diagonals are alternately activated/deactivated 180° out of phase. For half-bridge mode, one of the half-bridge circuits is operated as a half H-bridge while the other half-bridge circuit remains inactive. By being able to operate in either a full-bridge or a half-bridge mode, a wide control range is provided for efficiently generating maximum output voltages when needed (e.g., near positive and negative peaks of an AC line voltage at the converter's output) and low output voltages when needed (e.g., near zero-crossings of an AC line voltage at the converter's output). The decision whether to operate in full-bridge or half-bridge mode may be determined based on one or more current operating conditions of the converter, such as power and/or voltage received from each PV module, one or more AC line voltage parameters of the AC voltage on the AC line at the converter's output (e.g., RMS value, instantaneous value, and the like). The decision whether to operate in full-bridge or half-bridge mode may be made at each point in time (e.g., converter switching frequency) independent of the previous or current operating modes. However, other frequencies may be chosen so long as it is implemented at a high enough frequency to give the control sufficient time resolution (e.g., two orders of magnitude higher than the mains line frequency).

If the result of the determination at step 504 is to operate in full-bridge mode, the method 500 proceeds to step 506. At step 506, a switching frequency for the full-bridge mode is determined as well as the duty cycles for each switching diagonal. By adjusting the switching frequency, the amount of power transferred to the secondary winding side of the converter is controlled. Additionally, the amount of power drawn from each PV module is apportioned by setting the balance of the duty cycle between the diagonals; as such, the PV modules may each be biased at their individual desired operating voltages. For example, the ratio of the duty cycles for the diagonals may be set at 49/51 in order to draw more power from one of the PV modules.

If the result of the determination at step 504 is to operate in half-bridge mode, the method 500 proceeds to step 508. At step 508, a switching frequency for the half-bridge mode is determined as well as which half-bridge will be in an active switching state and which half-bridge will be in an inactive state. In some embodiments, a different half-bridge is employed as the active half-bridge each time the converter changes from full-bridge mode to half-bridge mode (i.e., the operation of each half-bridge is interleaved). Additionally, the amount of time apportioned to each half-bridge for switching may be adjusted to control the amount of power drawing from each PV module. For example, the amount of time that the first half-bridge circuit is running may be decreased and the amount of time that the second half-bridge circuit is running may be expanded in order to suitably apportion the amount of power drawn from one PV module versus the other.

The method 500 proceeds from each of steps 506 and 508 to step 510, where the bridge switches are operated as determined at step 506 or step 508. The resulting DC power may then be converted to an AC power (e.g., a single-phase or three-phase AC power) by the converter.

At step 512, a determination is made whether to continue operating. If the result of the determination is yes, the method 500 returns to step 504. If the result of the determination is no, the method 500 proceeds to step 514 where it ends.

In some embodiments, steps 504, 506 and 508 are implemented by determining a plurality of current operating conditions and, for a given set of operating conditions, selecting pre-determined operating parameters for the converter. For example, for current values of power and voltage received from each PV module, AC line voltage RMS value, and AC line voltage instantaneous value, pre-determined converter operating parameters (i.e., full-bridge or half-bridge mode, switching frequency, duty cycles for diagonals if in full-bridge mode, and which half-bridge to employ if in half-bridge mode) may be utilized for operating the converter. In some such embodiments, a look-up table (e.g., stored within the memory 283) may be used for identifying the converter operating parameters based on a given set of operating conditions.

Figure 6:
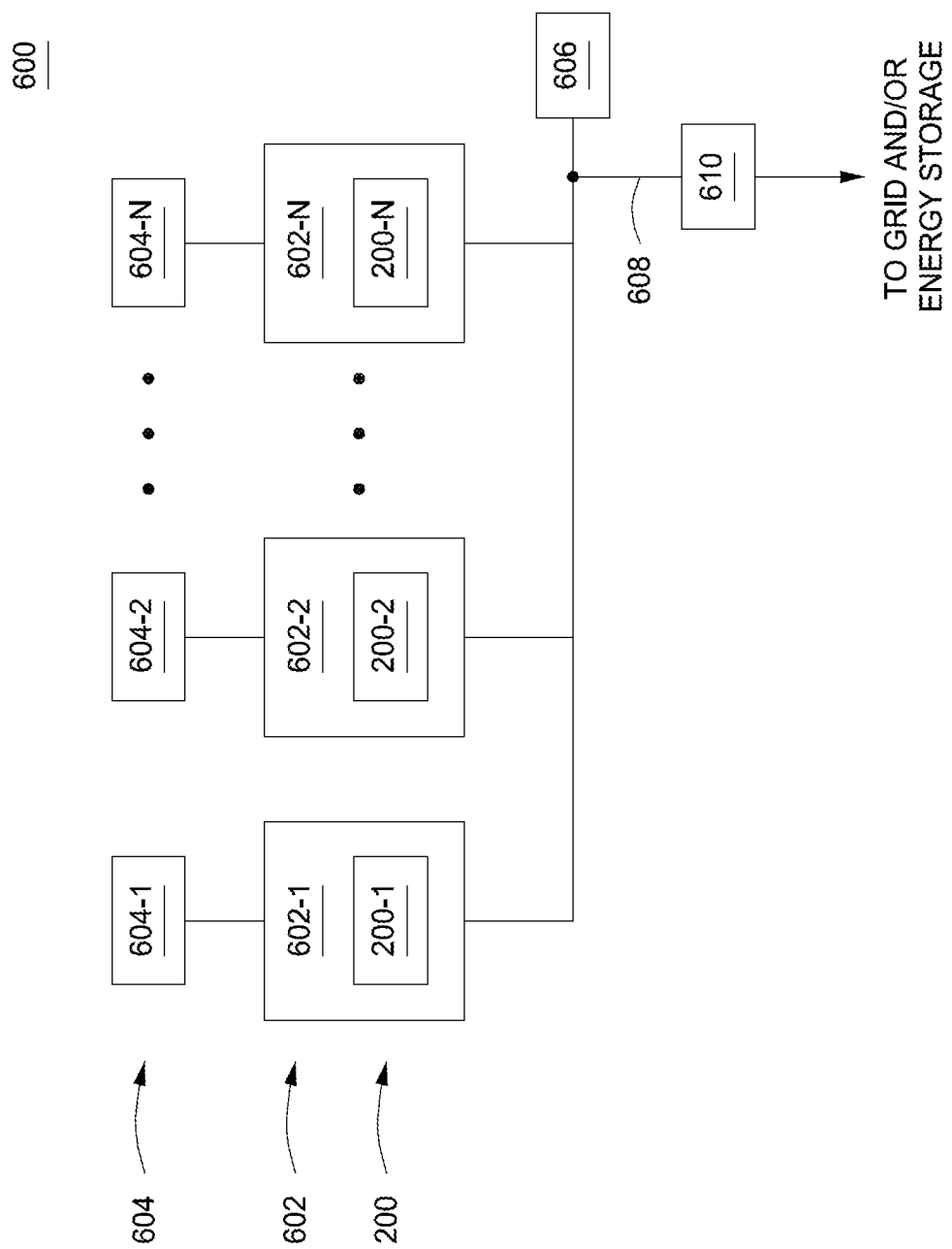
FIG. 6 is a block diagram of a system for power conversion comprising one or more embodiments of the present invention.

FIG. 6 is a block diagram of a system 600 for power conversion comprising one or more embodiments of the present invention. This diagram only portrays one variation of the myriad of possible system configurations and devices that may utilize the present invention. The present invention can be utilized in any system or device that uses a resonant converter for DC-AC or AC-DC power conversion.

The system 600 comprises a plurality of power converters 602-1, 602-2 . . . 602-N, collectively referred to as power converters 602; a plurality of DC power sources 604-1, 604-2 . . . 604-N, collectively referred to as DC power sources 604; a system controller 606; a bus 608; and a load center 610. The DC power sources 604 may be any suitable DC source, such as an output from a previous power conversion stage, a battery, a renewable energy source (e.g., a solar panel or photovoltaic (PV) module, a wind turbine, a hydroelectric system, or similar renewable energy source), or the like, for providing DC power.

Each power converter 602-1, 602-2 . . . 602-N is coupled to a single DC power source 604-1, 604-2 . . . 604-N, respectively; in some alternative embodiments, multiple DC power sources 604 may be coupled to a single power converter 602, for example a single centralized power converter 602. The power converters 602-1, 602-2 . . . 602-N comprise the converters 200-1, 200-2 . . . 200-N, respectively utilized during power conversion. Each of the converters 200-1, 200-2 . . . 200-N employs the half-bridge and full bridge operating technique previously described with independent power conversion control for input ports 202 and 211 in converter 200. In some embodiments, the power converters 602 may generate a single phase AC power output; in other embodiments, the power converters 602 may generate a split-phase or three-phase AC output.

The power converters 602 are coupled to the system controller 606 via the bus 608. The system controller 606 is capable of communicating with the power converters 602 by wireless and/or wired communication (e.g., power line communications) for providing operative control of the power converters 602. The power converters 602 are further coupled to the load center 610 via the bus 608.

The power converters 602 are each capable of converting the received DC power to AC power, although in other embodiments the power converters 602 may receive an AC input and convert the received input to a DC output. The power converters 602 couple the generated output power to the load center 610 via the bus 608. The generated power may then be distributed for use, for example to one or more appliances, and/or the generated energy may be stored for later use, for example using batteries, heated water, hydro pumping, $H_2O$-to-hydrogen conversion, or the like. In some embodiments, the power converters 602 convert the DC input power to AC power that is commercial power grid compliant and couple the AC power to the commercial power grid via the load center 610.

In some alternative embodiments, the power converters 602 may be DC-DC power converters; in other alternative embodiments, the power converters 602 may receive an AC input and be AC-AC converters (e.g., AC-AC matrix converters).

The foregoing description of embodiments of the invention comprises a number of elements, devices, circuits and/or assemblies that perform various functions as described. These elements, devices, circuits, and/or assemblies are exemplary implementations of means for performing their respectively described functions.

While the foregoing is directed to embodiments of the present invention, other and further embodiments of the invention may be devised without departing from the basic scope thereof.

The invention claimed is:

1. Apparatus for power conversion, comprising:
a three-port converter comprising:
a DC stage comprising a first half-bridge circuit that receives a first DC input power via a first DC port, and a second half-bridge circuit, decoupled from the first half-bridge circuit, that receives a second DC input power via a second DC port, wherein the DC stage converts at least one of the first or the second DC input power to a first power;
a resonant circuit that generates a second power from the first power received from the DC stage;
an AC stage that converts the second power from the resonant circuit to AC output power and couples the AC output power to an AC line via an AC port; and
a controller, coupled to the first and second half-bridge circuits, that controls the level of the AC output power by (i) operating the first half-bridge circuit and the second half-bridge circuit as a full H-bridge during a full-bridge operating mode during a first plurality of time periods, and (ii) operating one of the first half-bridge circuit or the second half-bridge circuit as a half H-bridge during a half-bridge operating mode during a second plurality of time periods.

2. The apparatus of claim 1, wherein the three-port converter operates in the full-bridge operating mode when an AC line voltage on the AC line is proximate peak values, and wherein the three-port converter operates in the half-bridge operating mode when the AC line voltage is proximate zero-crossings.

3. The apparatus of claim 2, wherein the first half-bridge circuit and the second half-bridge circuit are alternately utilized each time the half-bridge operating mode is employed.

4. The apparatus of claim 1, wherein the three-port converter adjusts an operating voltage for each of a first DC source coupled to the first DC port and a second DC source coupled to the second DC port to drive the first DC source and the second DC source toward their respective maximum power points (MPPs), wherein the operating voltages for each of the first DC source and the second DC source are independent of one another.

5. The apparatus of claim 4, wherein, for half-bridge operating mode, an amount of time for operating the first half-bridge circuit versus the second half-bridge circuit is apportioned based on an amount of power to be drawn from each of the first and the second DC sources.

6. The apparatus of claim 4, wherein, for full-bridge operating mode, duty cycles for diagonal switch pairs are apportioned based on an amount of power to be drawn from each of the first and the second DC sources.

7. The apparatus of claim 1, wherein the three-port converter is an AC-DC converter and converts AC power received at the AC port to DC output at at least one of the first DC port or the second DC port.

8. A method for operating a three-port converter, comprising:
converting, by a DC stage of the three-port converter having a (i) a first half-bridge circuit that receives a first DC input power via a first DC port and (ii) a second half-bridge circuit, decoupled from the first half-bridge circuit, that receives a second DC input power via a second DC port, at least one of the first or the second DC input power to a first power;
generating, by a resonant circuit, a second power from the first power from the DC stage; and
generating an AC output power from the second power from the resonant circuit, wherein the level of the AC output power is controlled by (a) operating the first half-bridge circuit and the second half-bridge circuit as a full H-bridge during a full-bridge operating mode during a first plurality of time periods, and (b) operating, during a second plurality of time periods interleaved with the first plurality of time periods, one of the first half-bridge circuit or the second half-bridge circuit as a half H-bridge during a half-bridge operating mode.

9. The method of claim 8, wherein each time period of the first plurality of time periods occurs when an AC line voltage on an AC line is proximate peak values, and wherein each time period of the second plurality of time periods occurs when the AC line voltage is proximate zero-crossings.

10. The method of claim 9, wherein the first half-bridge circuit and the second half-bridge circuit are alternately utilized during consecutive time periods of the second plurality of time periods.

11. The method of claim 8, further comprising adjusting an operating voltage, for each of a first DC source coupled to the first DC port and a second DC source coupled to the second DC port, to drive the first DC source and the second DC source toward their respective maximum power points (MPPs), wherein the operating voltages for each of the first DC source and the second DC source are independent of one another.

12. The method of claim 11, further comprising apportioning, based on an amount of power to be drawn from each of the first and the second DC sources, an amount of time for operating the first half-bridge circuit versus the second half-bridge circuit during the half-bridge operating mode.

13. The method of claim 11, further comprising apportioning, based on an amount of power to be drawn from each of the first and the second DC sources, duty cycles for diagonal switch pairs that are switched during the full-bridge operating mode.

14. The method of claim 8, wherein operation of the first half-bridge circuit and the second half-bridge circuit independently controls power input and output by the first DC port, the second DC port, and an AC port.

15. The method of claim 8 further comprising operating an AC stage to convert AC power received at an AC port to an AC stage output power, and operating the DC stage to convert the AC stage output power to DC output power that is coupled to at least one of the first DC port or the second DC port.

16. A system for power conversion, comprising:
a first photovoltaic (PV) module;
a second PV module;
a three-port converter comprising:
a DC stage comprising a first half-bridge circuit coupled to the first PV module for receiving a first DC input power via a first DC port and a second half-bridge circuit, decoupled from the first half-bridge circuit, coupled to the second PV module for receiving a second DC input power via a second DC port, wherein the DC stage converts at least one of the first or the second DC input power to a first power;
a resonant circuit that generates a second power from the first power received from the DC stage;
an AC stage that converts the second power from the resonant circuit to AC output power and couples the AC output power to an AC line via an AC port; and
a controller, coupled to the first and second half-bridge circuits, that controls the level of the AC output power by (i) operating the first half-bridge circuit and the second half-bridge circuit as a full H-bridge during a full-bridge operating mode during a first plurality of time periods, and (ii) operating one of the first half-bridge circuit or the second half-bridge circuit as a half H-bridge during a half-bridge operating mode during a second plurality of time periods.

17. The system of claim 16, wherein the three-port converter operates in the full-bridge operating mode when an AC line voltage on the AC line is proximate peak values, and wherein the three-port converter operates in the half-bridge operating mode when the AC line voltage is proximate zero-crossings.

18. The system of claim 17, wherein the first half-bridge circuit and the second half-bridge circuit are alternately utilized each time the half-bridge operating mode is employed.

* * * * *